Aug. 20, 1963

P. F. GOOD 3,101,042

PROPORTIONING DEVICE

Filed March 15, 1962

INVENTOR
Paul F. Good

BY
Bailey, Stephens & Huettig
ATTORNEYS

Aug. 20, 1963  P. F. GOOD  3,101,042
PROPORTIONING DEVICE
Filed March 15, 1962  2 Sheets-Sheet 2
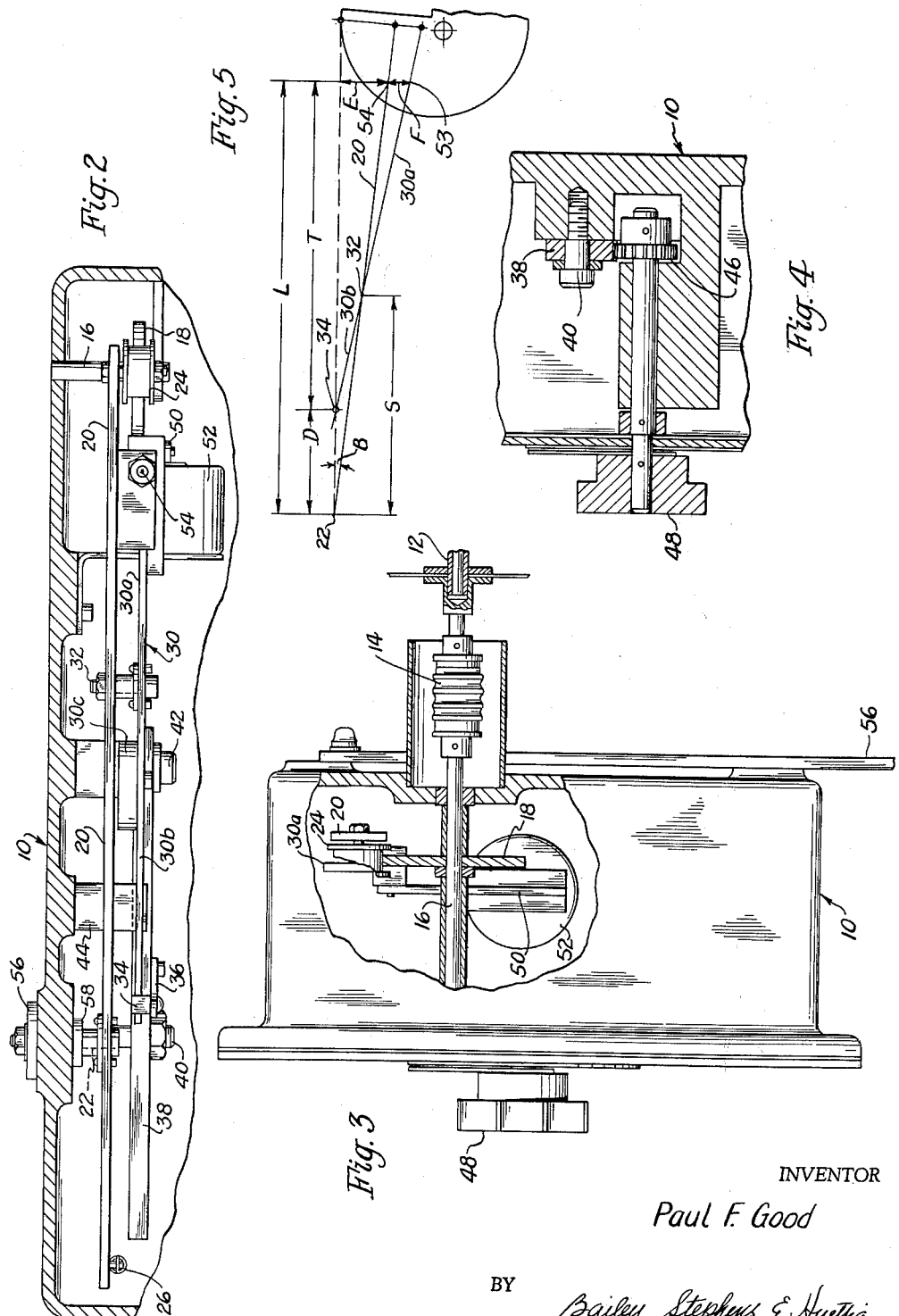
INVENTOR
Paul F. Good
BY
Bailey, Stephens & Huettig
ATTORNEYS 3,101,042
Patented Aug. 20, 1963

3,101,042
PROPORTIONING DEVICE
Paul F. Good, Lutherville, Md., assignor to Speedco, Inc., Baltimore, Md., a corporation of Maryland
Filed Mar. 15, 1962, Ser. No. 179,972
5 Claims. (Cl. 99—256)

This invention relates to a proportioning device and, in particular, is directed to a device which measures out a given percentage of a substance being added to another substance.

The device of this invention is specifically designed for the control of the amount of brine being pumped into a ham.

As shown in Beisser, U. S. Patent No. 2,088,257, it is possible to use a system of weighing scale operated levers in connection with an electrical circuit for controlling the brine pumping cycle. However, the Beisser device is complicated and relatively slow in operation. More modern devices are based on electronically operated circuits but, these are objectionable because of the corrosion and short-circuiting induced by the presence of such circuits in the brine spray saturated ham pumping rooms.

The objects of this invention are to produce a proportioning device which is quick in operation, is easily maintained, is accurate within a practical range of operation, can be adjusted to different percentages without change of parts, which is of relative inexpensive construction, and which can easily be used with a variety of weighing and proportioning systems.

In general, these and other objects of the invention are obtained by using a pivoting primary lever, the free end of which is moved by the turning of a weighing scale actuated cam, and a secondary lever pivotally joined to said primary lever. One end of the secondary lever is held stationary at a point which corresponds to the percent of brine weight being added to the ham weight on the scale. This fixed point is adjustable over a range of percents. An appropriate electrical circuit is provided for starting and stopping the brine pump in the performance of the pumping cycle.

The means by which these and other objects of the invention are obtained are described more fully with reference to the accompanying drawings, in which:

FIGURE 2 is a cross-sectional view taken on the line 2—2 of FIGURE 1;

FIGURE 3 is a side view of FIGURE 1 partially shown in section;

FIGURE 4 is a cross-sectional view taken on the line 4—4 of FIGURE 1; and

FIGURE 5 is a diagram illustrating the geometry of the proportioning system.

Figure 1:
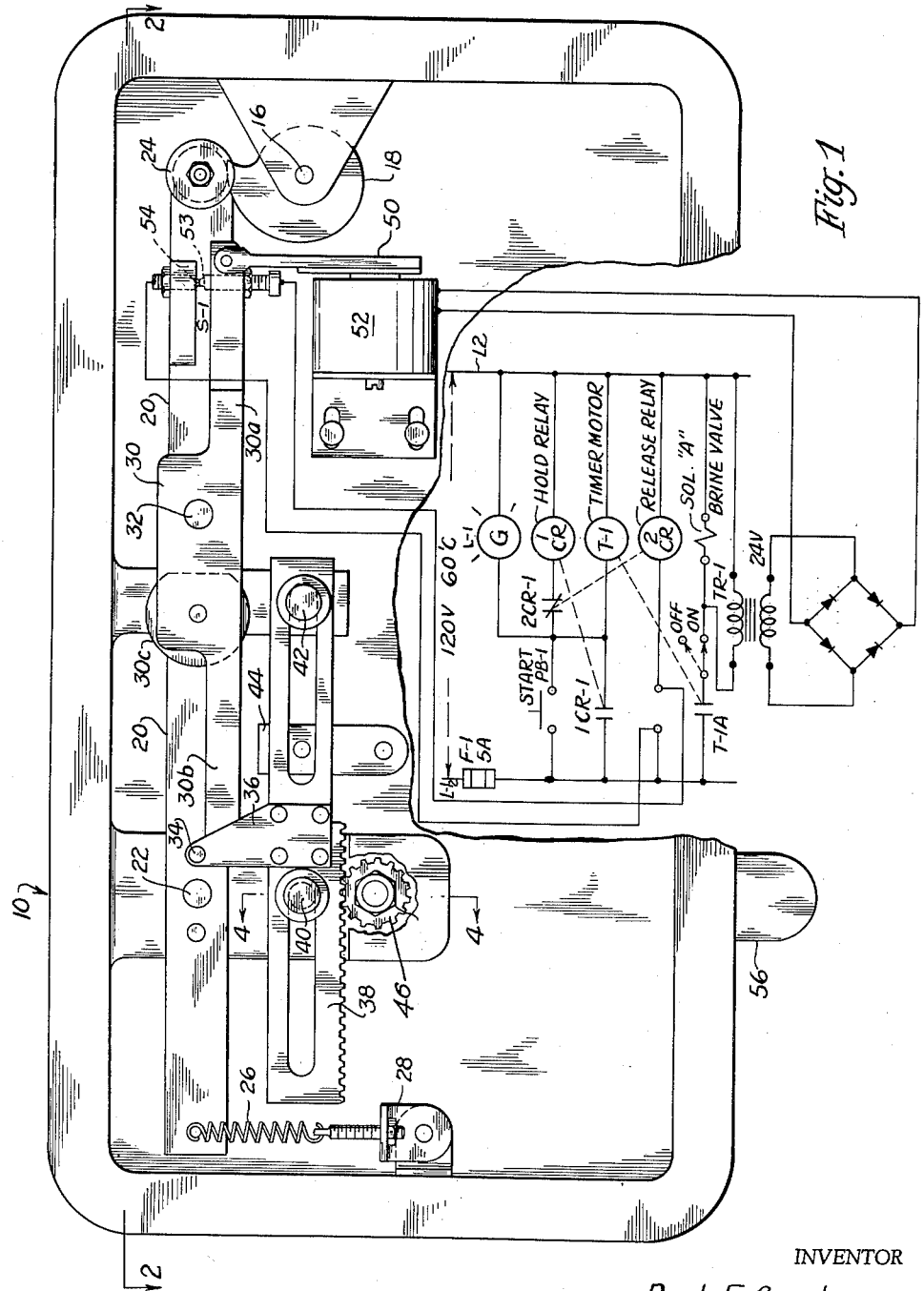
FIGURE 1 is a longitudinal cross-sectional view through the proportioning device.

As shown in FIGURE 1, the proportioning device is contained in a housing 10. The rotatable pointer shaft 12, note FIGURE 3, which rotates in response to a weight placed on the platform of a weighing scale, is connected by a flexible joint 14 to the shaft 16 of a constant displacement cam 18. This cam has a shape such that, for example, it will lower a lever or beam 0.01 inch per pound of material placed on the weighing platform of the scale.

A primary beam 20 is rotatably mounted on a pivot shaft 22 secured to said housing. The forward or free end of beam 20 has a roller 24 which rests on cam 18. The rear end of beam 20 is connected to a spring 26 having its other end joined to housing 10 by bracket 28 for providing a tension such that the roller 24 rides lightly upon cam 18.

A secondary beam 30 is pivotally mounted on a stub shaft 32 joined to primary beam 20. The free end arm 30a of this beam is balanced so that it is slightly heavier than the rear end 30b. This balance is obtained by means of a counterweight 30c attached to arm 30b. As arm 30a is heavier, upward movement of rear arm 30b is restricted by a stop pin 34. When there is no weight on the platform of the weighing scale, pin 34 keeps beam 30 from moving relative to beam 20. This stop pin 34 extends transversely from the top of a plate 36 which is attached to a rack bar 38. The rack bar slides over shoulder bolts 40 and 42 fastened to housing 10 and which extend through slots in the bar. Bar 38 is held against upward movement and pressed downwardly by an angle spring 44 onto shoulder bolts 40 and 42. A pinion 46 for moving rack bar 38 together with stop pin 34 is turnable exteriorly of housing 10 by means of a knob 48, note FIGURES 3 and 4.

At the free end of secondary beam arm 30a is a freely hung clapper 50. This clapper extends over the face of a solenoid 52 so that it can be locked in place when the solenoid is energized. The free end of this arm 30a also carries the lowermost contact point 53 of an electric switch. The corresponding contact point 54 is likewise mounted adjacent the free end of primary beam 20, it being noted that in both instances the contact points are insulated from their respective beams.

When the primary beam 20 and secondary beam 30 are in horizontal starting position, as shown in FIGURE 1, it is important that contacts 53 and 54 are closed, and if not closed, that they can be rapidly adjusted to become closed. For doing so, an adjusting lever 56 is secured to the bushing 58 in which pivot shaft 22 is journalled. The axis of the hole through bushing 58 is slightly eccentric with respect to the circumference of the bushing. Consequently, when lever 56 is moved to the right or the left from the vertical position shown in FIGURE 1, the pivot shaft 22 is either raised or lowered slightly, and thus the contact points 53 and 54 can be brought into contact at the starting position. Moreover, this adjustment can be made at any time by the lever 56 which lies exteriorly of housing 10.

As shown in the diagram of FIGURE 5, when the cam 18 is rotated to lower primary beam 20, the secondary beam is also lowered but at a proportionately faster rate, so that its free end 30a drops below the end of the primary beam. Thus when the primary beam has dropped a distance E, the secondary beam has dropped an additional distance F. The distance F is set by the position of the pin 34 through the movement of the bar 38 by turning the knob 48. The distance F then represents the proportional increase that is to be added to a given substance. Thus the percent of increase is F over E. This is expressed according to the formula $$\frac{F}{E} = \frac{TD}{L(S-D\cos B)}$$

wherein D is the distance between the pivot shaft 22 and the location of the stop pin 34, and as $$\sin B = \frac{E}{L}$$

the cos B is readily found. It is noted that this diagram contains an error in ignoring the arcs produced at the ends of the beams as they are dropped, but that this error is so small that it can be ignored for ordinary purposes.

An electrical circuit is actuated by contacts 53 and 54 to produce a ham brine pumping cycle according to the following example.

The knob 48 is first turned to control the percent of brine to be pumped into a ham and, in so doing, sets the position of stop pin 34. A ham is then placed on the weighing scale platform. As the scale platform lowers, the shaft 16 will rotate clockwise in proportion to the weight of the ham. Primary beam 20 will thus be lowered while secondary beam 30 is also lowered, but at a faster rate. However, secondary beam 30 cannot be lowered beyond the distance F, as determined by stop pin 34. The pumping needle is now inserted in the vein of the ham. The operator then closes the starting switch BP-1 momentarily to energize the electric control, schematically shown in FIGURE 1. At this time, the contacts 53 and 54 are already separated, thus the beam switch S-1 is open. The manual closing of the starting switch PB-1 energizes relay coil 1CR, closing relay contact 1CR-1. Current is then supplied through relay contact 1CR-1 to the green indicating light G, the coil of relay 1CR, and to timer motor T-1. The timer motor runs for a pre-set time delay period and then contact T-1A closes and simultaneously energizes the locking coil solenoid 52 and opens the solenoid SOL. "A" of the brine valve. The running of the timer motor allows the scale platform to come to rest before the clapper 50 is locked into a fixed position by solenoid 52 so that the position of contact point 53 is not thereafter changed during the brine pumping operation, as any change would produce an error in the percent of brine pumped. Brine valve solenoid SOL. "A" is energized so that brine begins to be pumped into the ham, and the additional weight being added to the scale causes the primary beam to start lowering again which continues until contact 54 renews contact with stationary contact 53. This then closes the beam switch S-1 and energizes the release relay 2CR to cause the normally closed contact 2CR-1 to open momentarily. This de-energizes the coil of relay 1CR and brings the control circuit back to the starting position. Thus the green light goes off and the pumping of the brine is stopped.

To zero the scale before pumping a batch of hams, the off-on switch is set to the off position. Then the push-button PB-1 is held closed while the scale platform is pushed down to a dial reading of about one pound or so. The push-button is released, and the scale is then allowed to return slowly to the dial zero position in order to see whether the light G goes off anywhere near the dial zero point. If not, the zeroing lever 56 is moved to the left or right as required, and the test is repeated until the light goes off at or very near the dial zero point. In this way, it is known that the zero or the starting point of the device matches the zero point of the dial and the device will operate from the proper position.

Also, as shown, a transformer and a full wave rectifier are used to actuate solenoid 52. Therefore, the device can be plugged into a 110 v., 60 cycle, A.C. circuit.

As a further example, it is assumed that a ten-pound ham is on the scale platform and that the cam 18 is so designed as to lower the contact 54 of the primary beam 20 0.01 inch per pound of ham, thus giving the distance E. Also, the distances L, T and S, FIGURE 5, are known by the physical construction of the apparatus and the distance D is given by the setting of the position of stop pin 34. Therefore, the apparatus automatically solves the distance F, which represents the proportional increase added to the substance being weighed.

The apparatus of this invention is useful for furnishing proportionate quantities in processes other than the pumping of brine into hams. For example, in one instance, the cam 18 can be replaced by a movable means such as a pressure-type bellows resting on the top of the end beam 30 carrying roller 24. Air or fluid pressure in the bellows at increasing pressure in response to a proportionate increase in the quantity of some substance would then move beam 30 downwardly. In this case, spring 28 would be tensioned to urge the beam against the bellows.

In another instance, cam 18 is replaced by a lever actuated in response to a mechanism giving a linear output in proportion to the quantity of a substance.

Having now described the means by which the objects of the invention are obtained,

I claim:

1. A proportioning device comprising movable means adapted to be actuated in response to the amount of a given substance, a primary beam having a fixed pivot point and a free end movably engaging said movable means, a secondary beam pivotally joined to said primary beam and having a free end adjacent said movable means, stop pin means for engaging said secondary beam at a point where the distance between the free ends of the primary and secondary beams caused by movement of said movable means represents a proportional increase over the amount of said given substance upon the addition of a substance to said given substance for making-up said proportional increase, and means for stopping such making-up upon the closing of the distance between said free ends.

2. A proportioning device as in claim 1, adjusting means for selectively positioning the point of engagement of said pin means with said secondary beam to set the percent of susbtance added to said given substance.

3. A proportioning device as in claim 2, further comprising means for fixing the position of the free end of said secondary beam upon the completion of the actuation of said movable means in response to said given substance.

4. A proportioning device as in claim 2, further comprising electrical time delay means for preventing the adding of substance to said given substance until actuation of said movable means by said given substance is halted.

5. A proportioning device as in claim 4, said means for fixing the position of the free end of said secondary beam comprising a clapper joined to said free end of said secondary beam, and solenoid means for holding said clapper in the fixed position.

No references cited.